US006094204A

United States Patent [19]

Takizawa

[11] Patent Number: 6,094,204

[45] Date of Patent: Jul. 25, 2000

[54] GRAPHICS DISPLAY UNIT

[75] Inventor: Tetsuro Takizawa, Tokyo, Japan

[73] Assignee: NEC Corporation, Tokyo, Japan

[21] Appl. No.: 09/064,500

[22] Filed: Apr. 23, 1998

[30] Foreign Application Priority Data

Apr. 24, 1997 [JP] Japan .................................. 9-107375

[51] Int. Cl.[7] ................................................ G06F 12/00

[52] U.S. Cl. .......................... 345/514; 345/202; 345/509

[58] Field of Search .................................. 345/514, 202, 345/509, 501, 508

[56] References Cited

U.S. PATENT DOCUMENTS

| | | | |
|---|---|---|---|
| 5,745,125 | 4/1998 | Deering et al. | 345/503 |
| 5,748,904 | 5/1998 | Huang et al. | 709/247 |
| 5,790,110 | 8/1998 | Baker et al. | 345/202 |

OTHER PUBLICATIONS

Linley Gwennap, "MediaGX Targets Low–Cost PCs", Microdesign Resources, vol. 11, No. 3, Mar. 10, 1997, 4 pages.

*Primary Examiner*—Kee M. Tung

*Attorney, Agent, or Firm*—McGinn & Gibb, P.C.

[57] ABSTRACT

A graphics display unit is equipped with a frame buffer, an image drawing unit, and a display unit. This frame buffer is arranged by a normal data storage region for directly storing a display content as pixel data, and a compression data storage region for compressing the pixel data as compression data. The display unit is equipped with a flag buffer for storing information indicating as to whether the storage content of said compression data storage region is valid, or invalid, and a compressing unit, and an expanding unit. When the display content is read, while the control unit refers to the flag buffer, if the compression data of the compression region is valid, then the compression data is read from the compression data region and this read compression data is restored as the original data by the expanding unit so as to display the original image. If the compression data is invalid, then the normal data is read from the normal data storage region to be displayed. At the same time, this normal data is compressed by the compressing unit and then the compressed data is stored into the compression data storage region, and a valid flag is set to the flag buffer. The image drawing unit writes the normal data into the normal data storage region to draw the original image. When the normal data is written into the normal data storage region, the image drawing unit clears the flag buffer.

9 Claims, 4 Drawing Sheets

| | VALID/INVALID | UPDATE TIME |
|---|---|---|
| #0 | 1 | 1000 |
| #1 | 0 | 1101 |
| #2 | 1 | 0000 |
| #3 | 1 | 0110 |
| #4 | 0 | 1111 |
| ⋮ | ⋮ | ⋮ |
| #3700 | 1 | 1000 |
| #3701 | 0 | 0111 |

| UPDATE TIME | REFERENCE VALUE |
|---|---|
| 0 | 500 |
| 1 | 400 |
| 2 | 300 |
| 3 | 200 |
| 4 | 100 |

GRAPHICS DISPLAY UNIT

BACKGROUND OF THE INVENTION

1. Field of the Invention

The invention relates to a graphics display unit.

2. Description of the Related Art

A conventional graphics display unit is arranged by, for instance, a frame buffer 1*a* for storing display image data in unit of a pixel (will be referred to as "pixel data" hereinafter), an image drawing unit 2*a,* a display unit 3*a,* and a D/A (digital-to-analog) converter 4. The respective pixel data which have been written and then saved into the frame buffer 1*a* by the image drawing unit 2*a* are sequentially read by the display unit 3*a* every display time period of a display unit. Then, an image is displayed on the display unit by processing the pixel data via the D/A converter 4. As a result, in such a case that the display resolution of this display unit is high and also a total number of display colors is large, the memory bandwidth required to read/display the pixel data is considerably increased. In such a graphics display unit that a single port memory is employed as the frame buffer, since this single port is commonly used in the pixel data display/read operation and the image drawing access operation, if the memory bandwidth required to display/read the pixel data is increased, then the image display access operation is restricted. As a consequence, the image drawing performance of this graphics display unit is considerably lowered. One typical example of the above-described conventional display apparatus is described in "MediaGX Targets Low-Cost PCs" written by Linley Gwennap, MICRODESIGN RESOURCES, Volume 11, No. 3, Mar. 10, 1997.

To solve the above-explained problem of the single port memory, there is a method for using a dual port memory in which both a pixel data display/read operation and an image drawing access operation can be performed by two independent ports. However, there is a difficulty such that the dual port memory requires very high cost, as compared with the single port memory.

The present invention has been made to solve the above-described drawbacks, and therefore, has an object to provide such a graphics display unit capable of increasing image drawing performance, while using a single port memory. That is, a compression data storage region for saving compression data is newly formed in a frame buffer in addition to the normal data storage region for saving the normal pixel data. When an image is displayed, the compression data storage region is utilized so as to reduce a memory bandwidth required in pixel data reading operation.

SUMMARY OF THE INVENTION

According to an aspect of the invention, there is provided a graphics display unit which comprises a frame buffer, an image drawing unit, a display unit and a D/A converter. The frame buffer includes a normal data storage region for directly storing a display content as normal data, and a compression data storage region for storing the normal data after being compressed as compression data. The display unit includes a flag buffer for storing flag information indicating as to whether the storage content (compression data) of the compression data storage region is valid, or invalid, a compressing unit for compressing the storage content (normal data) of the normal data storage region to write the compressed normal data into the compression data storage region, expanding unit for reading the storage content of the compression data storage region to restore an original image condition from the read storage content, and a control unit for controlling the flag buffer, the compressing unit, and the expanding unit in such a manner that when a writing operation is performed from the image drawing unit to the normal data storage region, the flag information of the flag buffer is invalidated; when display data is read out from the frame buffer, the control unit refers to the flag information of the flag buffer; when the read flag information is valid, the compression data is read out from the compression data storage region and the original image data restored by the expanding unit is outputted to the D/A converter; when the flag information is invalid, the normal data read from the normal data storage region is directly outputted to the D/A converter and also the data compressed by the compressing unit is written into the compression data storage region; and when the compression data writing operation is ended, the flag information of the flag buffer is set to be valid.

In the above-described graphics display unit, both the normal data storage region and the compression data storage region of the frame buffer are subdivided into a plurality of small storage regions respectively in an one-to-one correspondence; such flag information for indicating as to whether the compression data storage region corresponding to each of small subdivided storage regions is separately stored in the flag buffer;

when data writing operation is carried out from the image drawing unit to each of the small subdivided storage regions of the normal data storage region, the control unit invalidates the flag information of the flag buffer, corresponding to the data-written small storage region;

when the display data is read out from the frame buffer, the control unit refers to the flag information of the flag buffer with respect to each of the small storage regions;

when the read flag information is valid, the compression data is read out from the corresponding small storage region of the compression data storage region and the original image data restored by the expanding unit is outputted to the D/A converter; when the flag information is invalid, the normal data read from the corresponding small storage region of the normal data storage region is directly outputted to the D/A converter and also the data compressed by the compressing unit is written into the corresponding small storage region of the compression data storage region; and when butten sistem configuration ddata signal NECvalid flag if the bandwidth compression and the data ompression technique the compression signal data writing operation is ended, the flag information of the corresponding small storage region of the flag buffer is set to be valid.

In the above-mentioned graphics display unit, the control unit owns such a control function in that the control unit compares an amount of data compressed by the compression unit with a reference value arbitrarily set smaller than a capacity of each of the small storage regions of the compression data storage region; and when the data amount is larger than the reference value, the compressed data is not written into the corresponding small storage region of the compression data storage region, and the flag information of the corresponding small region of the flag buffer is not validated.

In the above-described graphics display unit, in addition to the flag information of the respective small storage regions, an update time when the data writing operation is carried out from the image drawing unit to the small storage regions during display time periods of several frames appearing immediately before is stored into the flag buffer; and the control unit owns such a control function that while the display data is read from the frame buffer, the flag information of the flag buffer is invalid, and the normal data is read from the corresponding small storage region of the normal data storage region is carried out; when the compression data compressed by the compression unit is written into the corresponding small storage region of the compression data storage region, the control unit compares the update times of the corresponding small storage region of the flag buffer with an arbitrarily set reference time; when the update times are larger than the reference time, the compression data is not written, but also the flag information of the corresponding small storage region of the flag buffer is not validated.

In the above-described graphics display unit, in addition to the flag information of the respective small storage regions, an update time when the data writing operation is carried out from the image drawing unit to the small storage regions during display time periods of several frames appearing immediately before is stored into the flag buffer; and the control unit owns such a control function that while the display data is read from the frame buffer, the flag information of the flag buffer is invalid, and the normal data is read from the corresponding small storage region of the normal data storage region is carried out; when the compression data compressed by the compression unit is written into the corresponding small storage region of the compression data storage region, the control unit refers to the update times of the corresponding small storage region of the flag buffer, and compares a data amount of the compression data obtained by the compressing unit with an arbitrarily set reference number every the update times; when the data amount is larger than the reference value set every the update times, the compression data is not written, but also the flag information of the corresponding small storage region of the flag buffer is not validated.

In the above-described graphics display unit, the compressing unit executes a run length compression operation, and sequentially registers newly appearing pixel data into a compression work table whose entry number is limited; when the same pixel data as the pixel data registered in the compression work table appears, compression data is outputted by using an entry number of the compression work table instead of the pixel data; when the expanding unit expands the run length compression, pixel data appeared in the compression data are sequentially registered into an expansion work table whose entry number is equal to that of the compression work table; and when an entry number is detected from the compression data, the detected entry number is converted into the pixel data registered at the entry number of the expansion work table, and is expanded so as to restore the original image.

BRIEF DESCRIPTION OF THE DRAWINGS

Other features and advantages will become apparent from the following description when taken in conjunction with the accompanying drawings, in which.

DETAILED DESCRIPTION OF THE PREFERRED EMBODIMENTS

Description will next be made on the preferred embodiments of the present invention referring to the Figures.

Figure 1A:
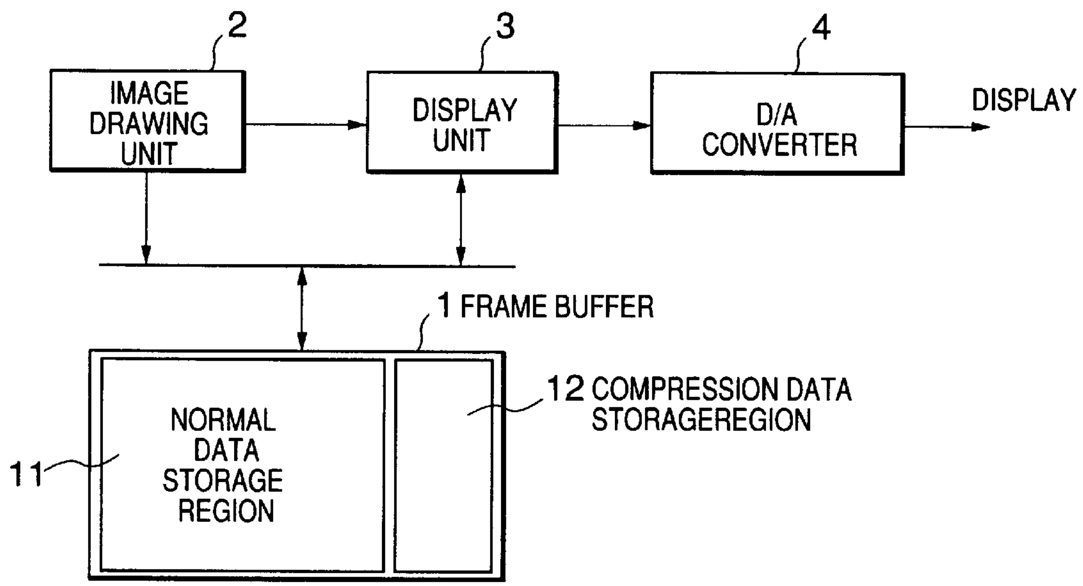
FIG. 1A is a schematic block diagram for indicating a first embodiment of the graphics display unit of the present invention.
Figure 1B:
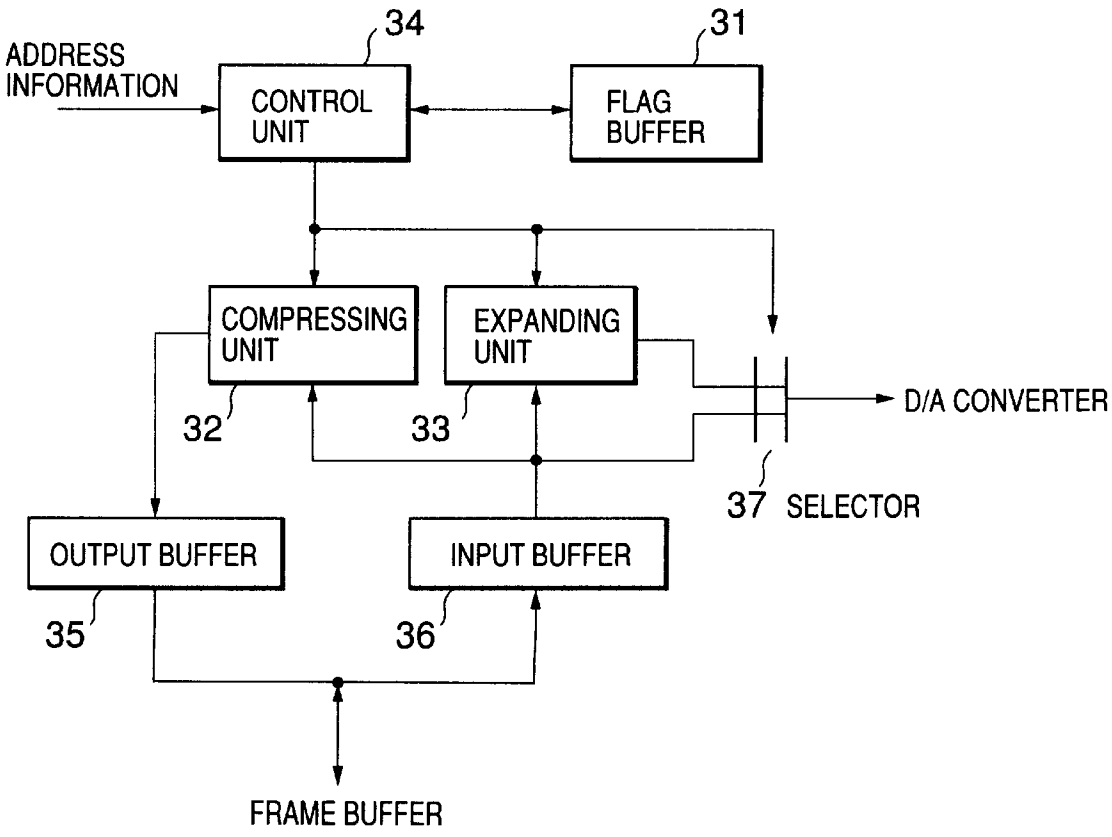
FIG. 1B is a block diagram showing the construction of a display unit 3.

FIGS. 1A and 1B is a schematic block diagram for indicating a first embodiment of the graphics display unit of the present invention.

As indicated in FIG. 1A, the graphics display unit, in the first embodiment, is arranged by a frame buffer 1 constructed of a normal data storage region 11 and a compression data storage region 12, an image drawing unit 2, a display unit 3, and a D/A (digital-to-analog) converter 4. The normal storage unit 11 directly stores a display content of a display as pixel data. The compression storage unit 12 compresses the display content to store the compressed pixel data. Furthermore, as represented in FIG. 1B, the display unit 3 is arranged by a flag buffer 31 for storing flag information for indicating whether the storage content of the compression data storage region 12 is valid, or invalid; a compressing unit 32 for compressing the storage content (pixel data stream) of the normal data storage region 11 to write the compressed pixel data stream into the compression data storage region 12; and an expanding unit 32 for reading the storage content (compressed pixel data stream) of the compression region 12 and for expanding the read storage data to restore the original display condition. Also, this display unit 3 is arranged by a control unit 34 for controlling the flag buffer 31, the compression storage unit 32, the expanding unit 33, and the like; an output buffer 35 for temporarily storing the compressed pixel data stream (compression data) derived from the compressing unit 33; an input buffer 36 for temporarily storing input data supplied to the compressing unit 32 and the expanding unit 33; and a selector 37 for selecting an output path to the D/A converter 4.

The display reading process operation is carried out under control of the control unit 34. When the flag information stored in the flag buffer 31 indicates that the compression data stored in the compression data storage region 12 is valid, the compression data is read from the compression data storage region 12 of the frame buffer 1. The compression data read from the compression data storage region 12 is restored into the original pixel data stream by the expanding unit 33. Then, the original pixel data stream is supplied via the selector 37 and the D/A converter 4 to the display, so that the original image is displayed thereon. To the contrary, when the flag information stored in the flag buffer 31 indicates that the compression data stored in the compression data storage region 12 is invalid, the pixel data stream is read from the normal data storage region 11 of the frame buffer 1. Then, the read pixel data stream is directly supplied via the D/A converter 4 to the display so as to display thereon the original image. At this time, the read pixel data stream is compressed by the compressing unit 32, and then the compressed pixel data stream is stored into the compression data storage region 12 of the frame buffer 1. When the compressing process operation of the image data for 1 frame is accomplished, the valid flag is set into the flag buffer 31, and this valid flag indicates that the compression data of the compression data storage region 12 is valid. It should be noted that when the amount of the compressed pixel data stream exceeds the storage capacity of the compression data storage region 12, the storage content of the compression data storage region 12 is invalidated and no valid flag is set to the flag buffer 31.

On the other hand, the content of the original image is drawn by writing the pixel data stream into the normal data storage region 11 of the frame buffer 1 by the image drawing unit 2. When the image drawing unit 2 writes the pixel data stream into the normal data storage region 11, the control unit 34 clears the storage content of the flag buffer 31 in response to address information supplied from the image drawing unit 2 in order to indicate that the storage content of the compression data storage region 12 is invalid. In the case that the image drawing operation is carried out during the image display time period, after the image data for 1 frame during the image processing operation has been completed, the flag buffer 31 is cleared. At this time, even in such a case that while the flag buffer 31 has been originally cleared, the normal data is read from the normal data storage region 11 and at the same time the compression data is stored into the compression data storage region 12, the valid flag is not set to the flag buffer 31.

As a result, when the same display image is repeatedly displayed on the display, since the compression data is read from the compression data storage region 12 of the frame buffer 1, the memory bandwidth required to read the image data may be reduced in correspondence with the compression rate. As a compression method, for example, the normal run length compression method may be used. Accordingly, it is possible to achieve a high compression rate, depending upon the display content.

For an easy understanding of the basic technical spirit of the present invention, the graphics display unit in the first embodiment mode is so arranged that one compression data storage region 12 is employed in correspondence with the normal data storage region 11 of the frame buffer 1 in order to execute the data compression process and the data expansion process in unit of frame. As a result, when the display content is changed after the same display content is repeatedly displayed, the memory bandwidth required to read the display content is reduced. Therefore, more room for storing images to be drawn develops, and thus the image drawing performance can be increased. However, in such a case that there is a change even in a portion of a display screen, there is a drawback, namely the above-described effect can not be achieved, since the compression data of the compression data storage region is not valid. To solve this drawback, both the normal data storage region and the compression data storage region in the frame buffer may be subdivided into a plurality of small storage regions, the total numbers of which are equal to each other. Then, the compression process and the expansion process may be carried out in the unit of not the above-described frame, but the subdivided small region.

Next, a description will now be made of a second embodiment of the graphics display unit of the present invention, capable of improving the above-described compression process and expansion process operations. That is, in this second embodiment, a normal data storage region and a compression data storage region of a frame buffer are subdivided into small storage regions, the total numbers of which are equal to each other, namely normal data small storage regions (small storage regions in normal data storage region) and compression data small storage regions (small storage regions in compression data storage region) provided in one-to-one correspondence. Also, flag information for indicating that the respective compression data small storage regions are valid, or invalid is set into the flag buffer.

Figure 2A:
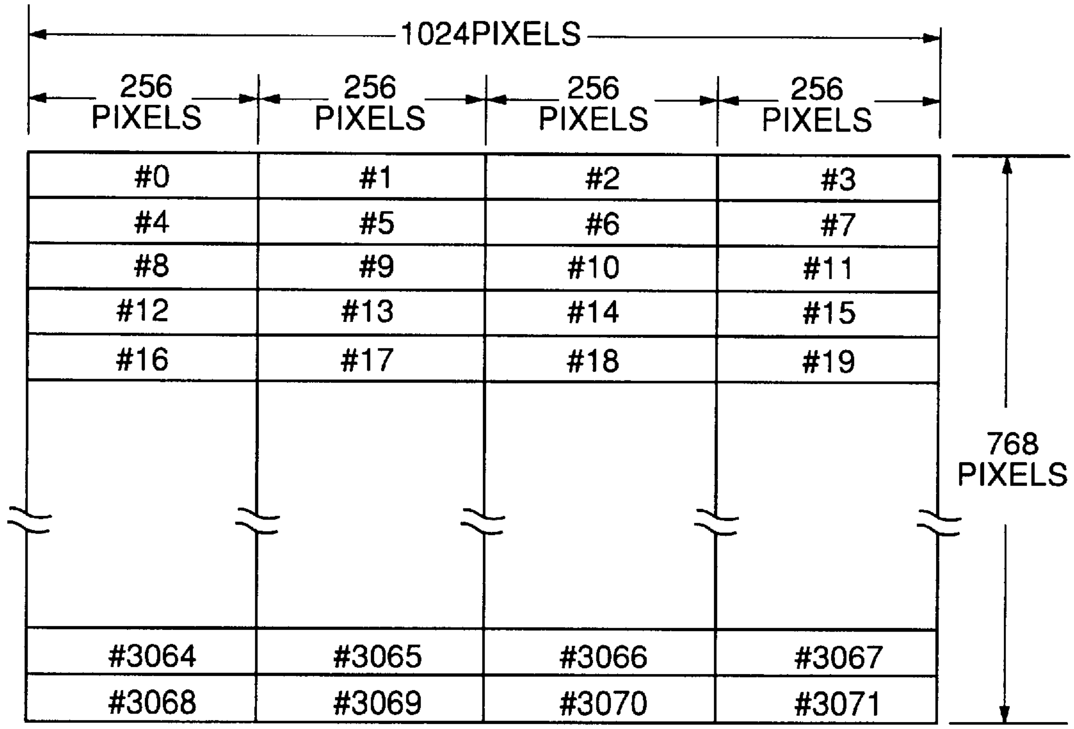
FIGS. 2A and 2B illustratively show an example of a storage region dividing method by a second embodiment of the graphics display unit of the present invention.
Figure 2B:
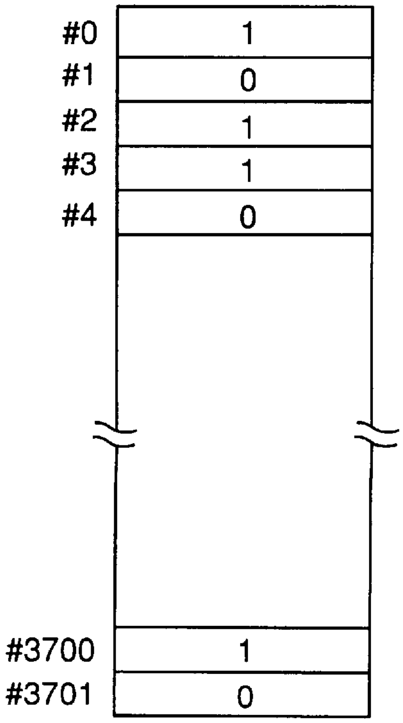

FIG. 2 shows an example of subdivided small storage regions of the flame buffer, and a structural example corresponding thereto of the flag buffer. FIG. 2A shows an example of the subdivided small storage regions of the frame buffer. That is, a display region made of 1,024×768 pixels is subdivided into 3,072 sets of small storage regions made of 256×1 pixels, numbered from #0 to #3,071. The flag buffer provided in correspondence with this region subdivision owns 3,072 bits (in total) of capacities whose 1 bit corresponds to each of 3,072 small storage regions. The 1-bit flag information of "0" indicates that the corresponding compression data small storage region is invalid, whereas the 1-bit flag information of "1" represents that the corresponding compression data small storage region is valid. Since the arrangement of the graphics display unit in the second embodiment is substantially same as that of the first embodiment except for the above-explained different arrangements of the frame buffer and the flag buffer, operations of this graphics display unit in the second embodiment will now be explained with reference to FIGS. 1A and 1B.

In the second embodiment, when the display data reading process operation is carried out, in the case that the flag information stored in the flag buffer 31 indicates that the compression data stored in the compression data small storage region corresponding to the small storage region to be read is valid, the reading operation is performed from the compression data small storage region of the frame buffer 1. The read compression data is restored into the original pixel data stream by the expanding unit 33, and then this original pixel data stream is supplied via the D/A converter 4 to the display so as to display the original image thereon. To the contrary, when the flag information stored in the flag buffer 31 indicates that the compression data stored in the corresponding compression data small storage region is invalid, the pixel data stream is read from the normal data small storage region of the frame buffer 1. Then, the read pixel data stream is directly supplied via the D/A converter 4 to the display so as to display thereon the original image. At this time, the read pixel data stream is compressed by the compressing unit 32, and then the compressed pixel data stream is stored into the corresponding compression data small storage region of the frame buffer 1. When the compressing process operation of the image data for 1 small storage region is accomplished, a valid flag is set into the flag buffer 31, and this valid flag indicates that the compression data of the corresponding compression data small storage region is valid. It should be noted that when the amount of the compressed pixel data stream exceeds the storage capacity of the compression data small storage region, no data writing operation into the compression data storage region is carried out, and the corresponding compression data small storage region is not valid. This is because if the compression data which does not become valid is written the compression data small region, then the extra memory bandwidth is accordingly required. To this end, the storage capacity of the output buffer 35 may be set larger than the storage capacity of the compression data small storage region. In such a case that the storage capacity of the output buffer 35 is smaller than the storage capacity of the compression data small storage region, similar to the above-described first embodiment, the data writing operation is carried out. However, it is so arranged that the written compression data small storage region is not valid.

On the other hand, the content of the original image is drawn by writing the pixel data stream into the normal data small storage region of the frame buffer 1. When the image drawing unit 2 writes the pixel data stream into a certain normal data small storage region, a flag of a corresponding small storage region in the flag buffer 31 is cleared in such a manner that the corresponding compression data small storage region is invalid. When an image drawing operation is performed with respect to a certain small region while displaying this certain small region, after the display data reading operation of this small region is completed, a flag of a corresponding small storage region in the flag buffer 31 is cleared. At this time, in such a case that the flag of the relevant small storage region of the flag buffer 31 has been originally cleared, and the data reading operation from the normal data small storage region is executed, and at the same time, the compression data is formed by the compressing unit 32, the graphics display unit in the second embodiment is controlled in such a manner that the compression data is not written, otherwise even when the compression data is written, the valid flag is not set to the relevant small storage region of the flag buffer 31.

As a consequence, when a display content is changed, compression data of a compression data small storage region is invalidated which corresponds to a normal data small storage region where an image drawing writing operation for changing this display content has been carried out. In the next frame, the data reading operation is carried out from the normal data small storage region. As to such a small storage region into which no data is written, the data reading operation is subsequently performed from the compression data small storage region. As a consequence, even when the display content is partially changed, the memory bandwidth required to read the display data is reduced, and thus the image drawing performance can be increased.

Next, a third embodiment of the graphics display unit of the present invention will now be explained. The third embodiment is accomplished by featuring the compression method and the expansion method of the first embodiment, or the second embodiment. That is, in this graphics display unit in the third embodiment, the normal run length compression method is carried out during compression operation, and also appearing pixel data are sequentially stored into a compression work table, the entry number of which is limited. In the case that pixel data identical to the pixel data stored in this compression work table appears later, the entry number of the table is used instead of this pixel data appeared later so as to increase the compression rate. Also, in this third embodiment, the run-length-compressed pixel data is restored during expansion operation, and pixel data appeared in the compression codes are sequentially stored into an expansion work table similar to the compression work table. The entry number appearing in the compression code is converted into pixel data by this expansion work table to thereby restore the original pixel data stream.

Figure 3:
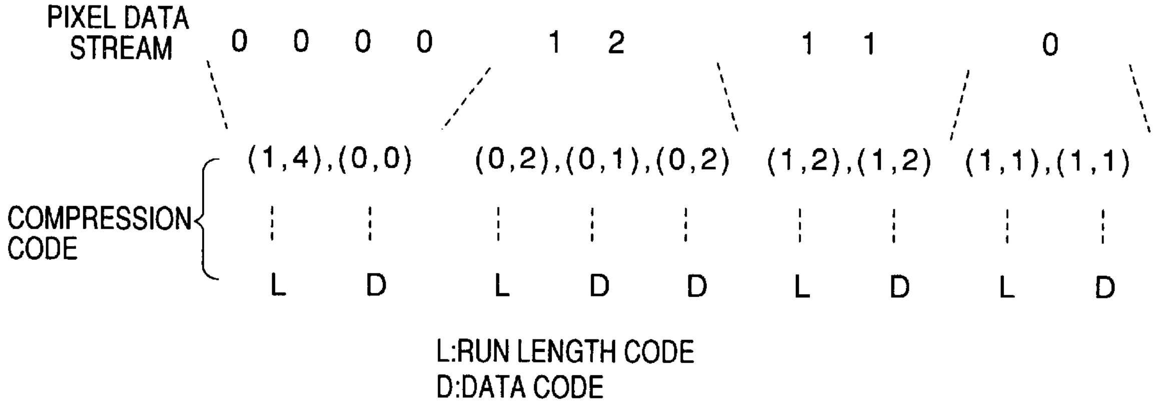
FIG. 3 illustratively indicates an example of code compression for explaining a data compressing operation in a third embodiment of the graphics display unit of the present invention.

Referring now to a concrete example shown in FIG. 3, compression operation and expansion operation executed in this third embodiment will be explained. It is now assumed that pixel data stream to be compressed is constructed of 9 pieces of pixel data, as indicated in FIG. 3, and each of these 9 pixel data is expressed by 24 bits. A run-length-compressed compression code is constituted by 1-bit discrimination information for indicating whether the same values are continued, or the different values are continued; a run length code "L" made of 8-bit length information indicative of a quantity of continued pixel data; and also a data code "D" representative of a data value of pixel data. The data code "D" subsequent to the run length code "L" is equal to 1 when the same value is continued. However, when the different values are continued, the data code "D", the total number of which is equal to the total number of the continued different values, are continued. In the case of the normal run length compression, the information indicative of the pixel data is employed in this data code "D", and when the pixel data is 24 bits, the data code "D" is also 24 bits. In the case of the compression method by the third embodiment, the data code "D" is further compressed by using the work table. In other words, the data code "D" is constituted by 1-bit discrimination information for indicating as to whether or not pixel data is stored into the work table; and data value information representative of either the pixel data or the entry number of the work table. Assuming now that a storage capacity of the work table is 256 entries, 8 bits are required so as to express the entry number, which is however less than 24 bits of the pixel data.

Since 4 pieces of pixel data "0" are continued at a head of the pixel data stream to be compressed, a 9-bit code (1, 4) is outputted as a run length code "L". This 9-bit code (1, 4) expresses that the same value is continued, and the lengths thereof are 4. As the data code "D" indicative of the pixel data "0" outputted subsequent to this 9-bit code, since the pixel data "0" firstly appears and is not yet stored in the work table, a 25-bit code (0, 0) is outputted. This 25-bit code (0, 0) is arranged by 1-bit discrimination information "0" for indicating that no pixel data is present in the work table, and also 24-bit data value information "0" indicative of this pixel data "0". Then, at this time, the pixel data "0" is stored into the first entry of the work table.

Next, since two pixel data having different values of "1" and "2" are continued in the pixel data stream, a 9-bit code (0, 2) is outputted as the run length code "L". This 9-bit code (0, 2) indicates that the different values are continued and the length is equal to 2. Since both the pixel data "1" and the pixel data "2" appear at a first stage and are not present in the work table, two 25-bit data codes (0, 1) and (0, 2) are outputted. Then, the pixel data "1" is stored in the second entry of the work table, and the pixel data "2" is stored in the third entry thereof.

Thereafter, two pixel data "1" are continued in the pixel data stream, a 9-bit code (1, 2) is outputted as the run length code "L". This 9-bit code (1, 2) indicates that the same value is continued and the length is equal to 2. At this time, since the pixel data "1" is present in the second entry of the work table, the pixel data is present in the work table, and a 9-bit data code "D" (1, 2) is outputted, which indicates that the entry number is equal to "2", and the pixel data is present in the work table.

Since only one pixel data "0" is present at last data of the pixel data stream, a 9-bit code (1, 1) is outputted as the run length code "L". This 9-bit code (1, 1) indicates that only one same value is continued. Subsequently, since the pixel data "0" already exists in the first entry of the work table, a 9-bit code (1, 1) is outputted, which indicates that the pixel data is present in the work table, and the entry number thereof is equal to 1.

As a result, the pixel data stream to be compressed owns the total information amount of 216 bits, namely 9 sets of 24-bit pixel data, whereas the compression code after the above-described compression owns the total information amount of 129 bits. To the contrary, in the case that the normal run length compression method is employed in which no work table is used, since all of the data codes are the pixel data and become 24 bits, the information amount of the compression code is equal to 156 bits. As a consequence, there is such a clear merit that the work table is used. In the above-described example shown in FIG. 3, the pixel data stream to be compressed is made of the 9 pixel data, namely short, and the appearing times of the same pixel data are small in order to easily understand the basic operation of this third embodiment. As a result, the resultant compression rate is not so high. To the contrary, in such an actual case that the pixel data stream to be compressed contains a large number of pixel data and also a total number of the same pixel data is large, a higher compression rate (1/10 to 1/several tens) may be effectively achieved. Also, the above-explained entry number, i.e., 256, of the work table is selected by suppressing the first embodiment having one compression data storage region. Alternatively, in the second embodiment case that the small storage region constructed of 256 pixels is selected as the compression unit, the total entry number of the work table may be made smaller than 256. If the entry number is selected to be 16, then the entry number may be expressed by 4 bits. It should be noted that when the compression work is accomplished with respect to the last data of the pixel data stream to be compressed, the storage content of the used work table is no longer required, and therefore is initialized. Then, the initialized work table may be used to compress the next pixel data stream to be compressed. Also, when all of the entries of the work table under use have been used, as to pixel data which subsequently appears and is not yet registered, the head entry is again used in the circulation manner.

Subsequently, a description will now be made of the expanding operation for restoring the compression code compressed in the above-described manner into the original pixel data stream.

First information of the compression codes is (1, 4) and (0, 0). Since these compression codes indicate that four same values are continued and also indicate such pixel data "0" which are not present in the work table, the restored pixel data stream becomes "0, 0, 0, 0". Then, at this time, the pixel data "0" is stored into a first entry of an expansion work table having plural entries equal to those of the compression work table used in the compression operation.

Next information of the compression codes is (0, 2), (0, 1), and (0, 2), and indicates that two different values are continued, and also indicates that these values are the pixel data "1" and "2" which are not present in the work table. Accordingly, the restored pixel data stream becomes "1, 2". Then, at this time, the pixel data "1" is stored into a second entry of the expansion work table, and the pixel data "2" is stored into a third entry thereof.

The next information of the compression codes is equal to (1, 2) and (1, 2), and represents that two same values are continued, and also indicates that the values thereof are equal to the second entry number of the work table. At this time, since the value is "1" when referring to the pixel data stored in the second entry of the expansion work table, "1, 1" is outputted as the restored pixel data stream.

The final information of the compression codes is equal to (1, 1) and (1, 1), and represents that only one same value is continued, and also indicates that this value is equal to the first entry number of the work table. At this time, when referring to the pixel data "0" stored in the first entry of the expansion work table, "0" is outputted as the restored pixel data stream.

As previously explained, the expansion operation is carried out while registering the pixel data into the work table in a similar process step introduced during the compression operation, so that the expansion work can be independently performed without saving the registered data during the compression operation. Therefore, the restored pixel data stream same as the pixel data stream to be compressed can be exclusively acquired. It should be understood that the above-described compression and expansion methods according to the third embodiment may be applied not only to the above-explained first and second embodiments, but also to fourth through sixth embodiments (will be discussed later).

Next, a fourth embodiment of the graphics display unit of the present invention will now be described. In the above-explained second embodiment, the normal data storage region and the compression data storage region of the frame buffer are subdivided into the normal/compression data small storage regions whose numbers are equal to each other. The flag for indicating as to whether each storage content of the compression data small storage regions is valid, or invalid is stored in the flag buffer. In the case that the storage content of the compression data small region is invalid and the normal data is read from the normal data small storage region, the read normal data is compressed and then the compressed data is written into the compression data small storage region except that the data amount of the compressed data exceeds the capacity of the compression data small storage region. Thus, the storage content of the compression data small storage region becomes valid. In contrast, according to the fourth embodiment, when the storage content of the compression data small storage region is invalid and the normal data is read from the normal data small storage region, the compressed data is written into the compression data small storage region, and then such a judgment as to whether or not the content of the compression data small storage region is valid is made based upon a reference value set by the user. This reference value is settable to be an arbitrary value smaller than the storage capacity of the compression data small region.

To write compression data into a compression data small storage region, a memory bandwidth corresponding to a data amount of this compression data is required. As a result, when a large amount of compression data is employed, an effect of using the compression data is relatively lowered, as compared with a small amount of compression data. As a consequence, such a judgment is made based on a data amount of compression data, and a reference value for this judgment can be arbitrarily set. That is, it is judged as to whether or not the compression which has been compressed during the display data reading operation and then has been written into the output buffer is written into the compression data small region to be valid. In other words, the data amount of the compressed data is compared with the arbitrary settable reference value. Then, the compression data is written into the compression data small storage region only when the data amount of the compressed data is smaller than, or equal to the reference value. As a result, the storage content of this compression data small storage region is validated.

Figure 4:
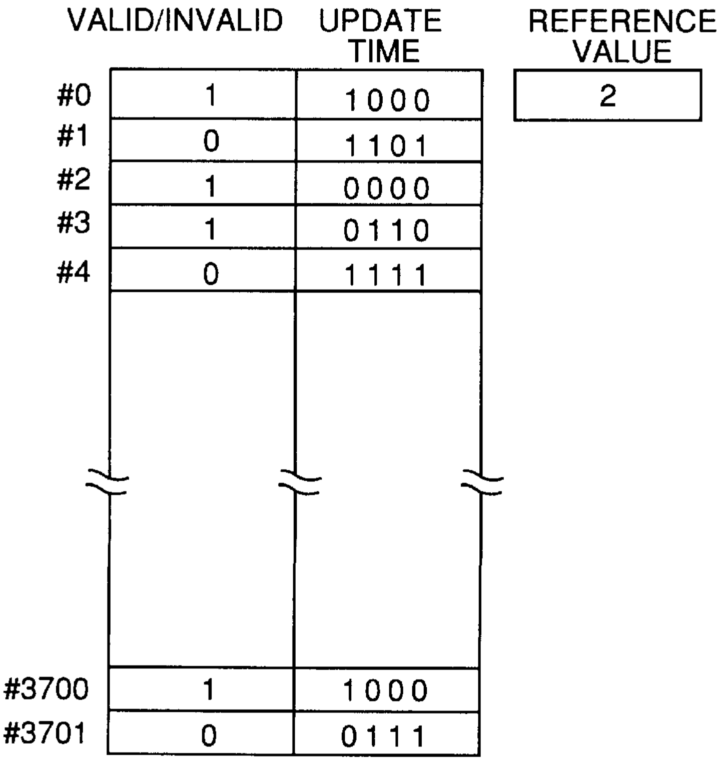
FIG. 4 illustratively shows a flag buffer and a reference value for explaining operation of a fifth embodiment of the graphics display unit of the present invention.

Referring now to FIG. 4, a fifth embodiment of the graphics display unit of the present invention will be described. In accordance with the fifth embodiment, in addition to 1-bit flag information for indicating as to whether or not the compression data small storage region corresponding to each of the normal data small storage regions is valid, update time information is additionally provided with the flag buffer of the second embodiment. This update time information indicates how many times the normal data have been written into this normal data storage region while several frames were displayed in the past. In the case that a normal data writing operating into a certain normal data small storage region happens to occur while displaying a certain frame, the least significant bit of the update time information of this normal data small storage region is set to "1", and when the next frame is displayed, the value of the update time information is shifted by 1 bit along a left direction and also the least significant bit thereof is set to "1", namely new values. With the above-described operation, a quantity of this bit "1" contained in the update time information becomes the update time.

In the embodiment of FIG. 4, since the update time information of each of the normal data small storage regions owns the 4-bit capacity, the information for the past 4 frames is saved. While 1 frame is displayed, even when the data writing operation is carried out plural times in the same normal data small storage region, these data writing operations are counted as 1 time.

When the display data is read, referring to the update time information of the flag buffer, a judgment is made as to whether or not a compression small storage region is made valid after the results of a compression operation are stored in the compression small storage region. Only when the update time is smaller than, or equal to a preset reference value, the compression small region is validated. In the example of FIG. 4, since the reference value is set to "2", a small storage region in the compression data small storage regions is not validated, which owns the update times such as the small storage region numbers #1 and #4 larger than "2". This is because as to the small storage region which is frequently updated, even when the compression data is written into the compression data storage region, no compression data is read from the compression data small storage region, and there is a great possibility that the memory bandwidth required to write the compression data becomes useless. Therefore, such a compression data writing operation is avoided.

Next, a sixth embodiment of the graphics display unit of the present invention will now be explained with reference to FIG. 5. A structural content and an updating sequence of a flag buffer employed in the sixth embodiment are the same as those of the above-described fifth embodiment. However, a setting method of a reference value of this sixth embodiment is different from that of the fifth embodiment, by which compression data is written, and a storage content of a compression data small storage region is validated.

In other words, when the display data is read, referring to update time information of the flag buffer, a judgment is made as to whether or not a compression small storage region is made valid after the results of a compression operation are stored in the compression small storage region, based upon such a comparison between a data amount of compressed data and a reference value for a data amount set every update time. Concretely speaking, only when the data amount of the compressed data is smaller than, or equal to the corresponding reference value of the update time, the compression data is written into the compression data small storage region so as to validate this compression data small storage region.

Figures 5, 6:
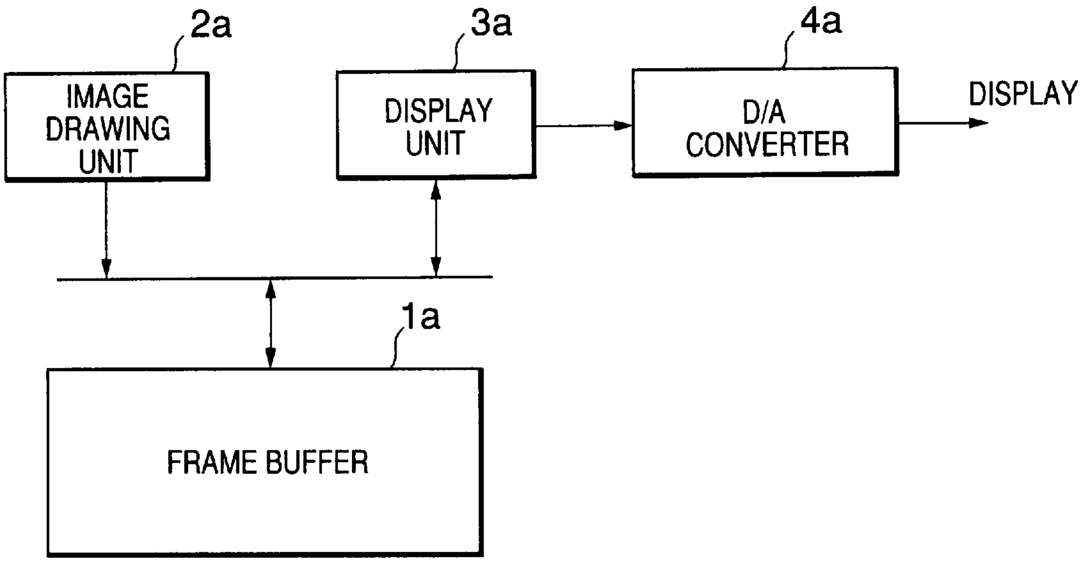
FIG. 5 illustratively shows a flag buffer and a reference value for explaining operation of a sixth embodiment of the graphics display unit of the present invention.
FIG. 6 is a schematic block diagram for representing one example of the conventional graphics display unit.

In the example of FIG. 5, when the update time is zero time, the reference value is set to "500". When the update time is one time, the reference value is set to "400". When the update time is two times, the reference value is set to "300". When the update time is three times, the reference value is set to "200". When the update time is four times, the reference value is set to "100". Since the update time is one time in the small storage region having the small storage number #0, when the display data is read from the normal data small storage region and the normal data is compressed, if the data amount of the compressed data is larger than "400", then the storage content of the compression data small storage region is not validated. Similarly, in the small storage region having the small storage region number #1, the update time is three times. As a result, when the data amount of the compressed data is larger than "200", the storage content of the compression data small storage region is not validated. As previously explained, when the update operation is frequently carried out, the data amount of the compressed data to be written is limited to such a small amount. As a consequence, the memory bandwidth with the higher possibility at which the memory bandwidth is uselessly used to write the compression data can be effectively suppressed.

As previously described in detail, in accordance with the present invention, since the occupation of the memory bandwidth by the display data reading operation can be suppressed, even in such a case that the high display resolution is required and a total number of display colors is large, while the single port memory is employed as the frame buffer, the graphics display unit with the high image drawing performance can be provided.

What is claimed is:

1. A graphics display unit having a frame buffer, an image drawing unit, a display unit and a D/A converter, said graphics unit comprising:

said frame buffer including a normal data storage region for directly storing a display content as normal data, and a compression data storage region for storing said normal data after being compressed as compression data; and said display unit including:

a flag buffer for storing flag information indicating as to whether the storage content (compression data) of said compression data storage region is valid, or invalid;

a compressing unit for compressing the storage content (normal data) of said normal data storage region to write the compressed normal data into said compression data storage region;

expanding unit for reading the storage content of said compression data storage region to restore an original image condition from said read storage content; and a control unit for controlling said flag buffer, said compressing unit, and said expanding unit in such a manner that when a writing operation is performed from the image drawing unit to the said normal data storage region, the flag information of the flag buffer is invalidated; when display data is read out from said frame buffer, the control unit refers to said flag information of said flag buffer; when the read flag information is valid, the compression data is read out from said compression data storage region and the original image data restored by said expanding unit is outputted to said D/A converter; when the flag information is invalid, the normal data read from said normal data storage region is directly outputted to the D/A converter and also the data compressed by said compressing unit is written into said compression data storage region; and when said compression data writing operation is ended, the flag information of said flag buffer is set to be valid.

2. A graphics display unit as claimed in claim 1 wherein:

both said normal data storage region and said compression data storage region of said frame buffer are subdivided into a plurality of small storage regions respectively in an one-to-one correspondence; such flag information for indicating as to whether the compression data storage region corresponding to each of small subdivided storage regions is separately stored in said flag buffer;

when data writing operation is carried out from said image drawing unit to each of said small subdivided storage regions of said normal data storage region, said control unit invalidates the flag information of the flag buffer, corresponding to the data-written small storage region;

when the display data is read out from said frame buffer, the control unit refers to said flag information of said flag buffer with respect to each of said small storage regions; when the read flag information is valid, the compression data is read out from the corresponding small storage region of said compression data storage region and the original image data restored by said expanding unit is outputted to said D/A converter;

when the flag information is invalid, the normal data read from the corresponding small storage region of said normal data storage region is directly outputted to the D/A converter and also the data compressed by said compressing unit is written into the corresponding small storage region of said compression data storage region; and when said compression data writing operation is ended, the flag information of the corresponding small storage region of said flag buffer is set to be valid.

3. A graphics display unit as claimed in claim 2 wherein:

said control unit owns such a control function in that said control unit compares an amount of data compressed by said compression unit with a reference value arbitrarily set smaller than a capacity of each of said small storage regions of said compression data storage region; and when said data amount is larger than said reference value, the compressed data is not written into the corresponding small storage region of said compression data storage region, and the flag information of the corresponding small region of said flag buffer is not validated.

4. A graphics display unit as claimed in claim 2 wherein:

in addition to the flag information of the respective small storage regions, an update time when the data writing operation is carried out from said image drawing unit to said small storage regions during display time periods of several frames appearing immediately before is stored into said flag buffer; and said control unit owns such a control function that while the display data is read from the frame buffer, the flag information of said flag buffer is invalid, and the normal data is read from the corresponding small storage region of the normal data storage region is carried out; when the compression data compressed by said compression unit is written into the corresponding small storage region of said compression data storage region, said control unit compares said update times of the corresponding small storage region of said flag buffer with an arbitrarily set reference time; when said update times are larger than said reference time, said compression data is not written, but also the flag information of the corresponding small storage region of said flag buffer is not validated.

5. A graphics display unit as claimed in claim 2 wherein:

in addition to the flag information of the respective small storage regions, an update time when the data writing operation is carried out from said image drawing unit to said small storage regions during display time periods of several frames appearing immediately before is stored into said flag buffer; and said control unit owns such a control function that while the display data is read from the frame buffer, the flag information of said flag buffer is invalid, and the normal data is read from the corresponding small storage region of the normal data storage region is carried out; when the compression data compressed by said compression unit is written into the corresponding small storage region of said compression data storage region, said control unit refers to said update times of the corresponding small storage region of said flag buffer, and compares a data amount of said compression data obtained by said compressing unit with an arbitrarily set reference number every said update times; when said data amount is larger than said reference value set every said update times, the compression data is not written, but also the flag information of the corresponding small storage region of said flag buffer is not validated.

6. A graphics display unit as claimed in claim 1 wherein:

said compressing unit executes a run length compression operation, and sequentially registers newly appearing pixel data into a compression work table whose entry number is limited; when the same pixel data as the pixel data registered in said compression work table appears, compression data is outputted by using an entry number of said compression work table instead of said pixel data; when said expanding unit expands the run length compression, pixel data appeared in the compression data are sequentially registered into an expansion work table whose entry number is equal to that of said compression work table; and when an entry number is detected from the compression data, said detected entry number is converted into the pixel data registered at said entry number of said expansion work table, and is expanded so as to restore the original image.

7. A graphics display unit as claimed in claim 2, wherein:

said compressing unit executes a run length compression operation, and sequentially registers newly appearing pixel data into a compression work table whose entry number is limited;

when the same pixel data as the pixel data registered in said compression work table, appears, compression data is outputted by using an entry number of said compression work table instead of said pixel data;

when said expanding unit expands the run length compression, pixel data having appeared in the compression data are sequentially registered into an expansion work table whose entry number is equal to that of said compression work table; and when an entry number is detected from the compression data, said detected entry number is converted into the pixel data registered at said entry number of said expansion work table, and is expanded so as to restore the original image.

8. A graphics display unit as claimed in claim 3, wherein:

said compressing unit executes a run length compression operation, and sequentially registers newly appearing pixel data into a compression work table whose entry number is limited;

when the same pixel data as the pixel data registered in said compression work table, appears, compression data is outputted by using an entry number of said compression work table instead of said pixel data;

when said expanding unit expands the run length compression, pixel data having appeared in the compression data are sequentially registered into an expansion work table whose entry number is equal to that of said compression work table; and when an entry number is detected from the compression data, said detected entry number is converted into the pixel data registered at said entry number of said expansion work table, and is expanded so as to restore the original image.

9. A graphics display unit as claimed in claim 5, wherein:

said compressing unit executes a run length compression operation, and sequentially registers newly appearing pixel data into a compression work table whose entry number is limited;

when the same pixel data as the pixel data registered in said compression work table, appears, compression data is outputted by using an entry number of said compression work table instead of said pixel data;

when said expanding unit expands the run length compression, pixel data having appeared in the compression data are sequentially registered into an expansion work table whose entry number is equal to that of said compression work table; and when an entry number is detected from the compression data, said detected entry number is converted into the pixel data registered at said entry number of said expansion work table, and is expanded so as to restore the original image.

* * * * *